(12) United States Patent
Zeiss et al.

(10) Patent No.: US 7,834,278 B1
(45) Date of Patent: Nov. 16, 2010

(54) LABORATORY INSTRUMENT WITH A PROTECTED WORKING COMPARTMENT

(75) Inventors: Siegfried Zeiss, Wolfhausen (CH); Bruno Nufer, Illnau (CH)

(73) Assignee: Mettler-Toledo AG, Greifensee (CH)

( * ) Notice: Subject to any disclaimer, the term of this patent is extended or adjusted under 35 U.S.C. 154(b) by 0 days.

(21) Appl. No.: 12/782,384

(22) Filed: May 18, 2010

Related U.S. Application Data

(63) Continuation of application No. PCT/EP2008/063266, filed on Oct. 3, 2008.

(30) Foreign Application Priority Data

Nov. 19, 2007 (EP) .................................. 07121016

(51) Int. Cl.
*G01G 21/00* (2006.01)
*G01G 21/28* (2006.01)
(52) U.S. Cl. ..................................................... 177/180
(58) Field of Classification Search ................. 177/180, 177/181
See application file for complete search history.

(56) References Cited

U.S. PATENT DOCUMENTS

| 4,700,793 | A | | 10/1987 | Lüchinger | |
|---|---|---|---|---|---|
| 4,705,187 | A | | 11/1987 | Linn | |
| 4,798,250 | A | * | 1/1989 | Knothe et al. | 177/181 |
| 4,862,978 | A | * | 9/1989 | Borchard | 177/180 |
| 4,862,979 | A | * | 9/1989 | Borchard | 177/181 |
| 5,058,692 | A | * | 10/1991 | Melcher et al. | 177/181 |
| 5,074,369 | A | * | 12/1991 | Strickler | 177/180 |
| 5,152,356 | A | * | 10/1992 | Strickler et al. | 177/180 |
| 5,264,667 | A | * | 11/1993 | Luechinger et al. | 177/180 |
| 6,129,237 | A | | 10/2000 | Miyahara | |
| 6,504,112 | B1 | | 1/2003 | Luebke et al. | |
| 6,557,391 | B2 | | 5/2003 | Lüchinger | |
| 6,603,081 | B2 | | 8/2003 | Lüchinger | |
| 6,686,545 | B2 | | 2/2004 | Lüchinger et al. | |
| 6,849,809 | B2 | * | 2/2005 | Luchinger et al. | 177/180 |
| 6,909,058 | B2 | * | 6/2005 | Luchinger et al. | 177/180 |
| 6,998,544 | B2 | * | 2/2006 | Nomura | 177/181 |
| 7,193,164 | B2 | * | 3/2007 | Olesen et al. | 177/180 |

FOREIGN PATENT DOCUMENTS

| EP | 1055381 A2 | 11/2000 |
|---|---|---|
| JP | 62-211482 A | 9/1987 |
| JP | 8-166280 A | 6/1996 |
| JP | 10-253434 A | 9/1998 |

OTHER PUBLICATIONS

Translation of JP08-166,280 (Jun. 1996).*
Translation of JP10-253,434 (Sep. 1998).*

* cited by examiner

*Primary Examiner*—Randy W Gibson
(74) *Attorney, Agent, or Firm*—Standley Law Group LLP

(57) ABSTRACT

A laboratory instrument with a housing containing a weighing cell has a working compartment that is connected to the housing. The working compartment has a floor, a top cover, a rear wall, a front wall and two sidewalls. Arranged in the working compartment is a load receiver which is connected to the weighing cell. Also connected to the housing is at least one guiding device which serves to guide a linear movement and simultaneous swivel movement of individual portions of the front wall or the entire front wall.

19 Claims, 4 Drawing Sheets

LABORATORY INSTRUMENT WITH A PROTECTED WORKING COMPARTMENT

CROSS-REFERENCE TO RELATED APPLICATIONS

This application is a continuation under 35 USC §120 of PCT/EP2008/063266, filed 3 Oct. 2008, which is in turn entitled to benefit of a right of priority under 35 USC §119 from European patent application 07 12 1016.5, which was filed 19 Nov. 2007. The content of each of the applications is incorporated by reference as if fully recited herein.

TECHNICAL FIELD

The disclosed embodiments relate to a laboratory instrument with a working compartment, a housing which contains a weighing cell, and a load receiver which is arranged in the working compartment and connected to the weighing cell, further with a floor, a top cover, a rear wall, a front wall and two sidewalls, which delimit the working compartment against the surrounding space of the laboratory instrument.

BACKGROUND OF THE ART

Laboratory instruments of this kind serve for example as analytical balances in many fields of industry, particularly in laboratories of research- and development departments, and also in production facilities, for example in quality control.

An analytical balance with a working compartment is described in detail in U.S. Pat. No. 4,700,793 A, which is commonly-owned, although now expired. Analytical balances are balances with a high resolution of the weighing result. Consequently, even the smallest extraneous influences affecting the weighing object or the load receiver can cause an error in the weighing result. The extraneous influence factors are rarely stable, and this can lead to situations where the exact weight of the weighing object cannot be determined. To protect the weighing system from being influenced by the ambient environment, a working compartment is therefore enclosed with a so-called draft shield.

As described in U.S. Pat. No. 4,700,793 A, the draft shield of an analytical balance has in most cases two slidable sidewalls and possibly also a slidable top cover, as the delivery of the weighing material to the load receiver usually occurs from the side, in some cases also from above. Normally, the front wall is rigidly connected to the housing of the balance, acting as a supporting element and thereby lending stability to the draft shield. Whenever possible, "slicing" closure means are preferred, meaning that for example slidable sidewalls are preferred over swiveling sidewalls. The closure means in the present context are referred to as "slicing" if in their opening and closing movements they slice the air and thus cause only a very small amount of air movement. This helps that the air inside the working compartment comes to rest very quickly. In addition, the air in the working compartment is shifted around only to a minimal extent, so that the temperature inside the weighing compartment can settle into a relatively stable profile over the height of the weighing compartment. In comparison, closure means that swivel will set large air masses into motion inside the weighing compartment. For a short time during opening and closing, a pressure difference occurs between the working compartment and the ambient space, with the pressure then equalizing itself through leaks in the draft shield, whereby air movements are caused again inside the working compartment.

A draft shield further needs to be of a stable design to hold its shape, so that harmful air movements of the ambient environment will not deform the walls and no air movements which could occur as a result of such deformations will propagate into the working compartment.

To facilitate the cleaning of the working compartment and in particular the sidewalls, a draft shield is proposed in commonly-owned U.S. Pat. No. 6,686,545 B2, whose front wall and sidewalls can be released from a form-fitting attachment by means of a swivel movement and can be removed from the balance through a subsequent pulling movement. The top cover is connected by a linear sliding guide to the balance housing which serves as rear wall and can be pushed back horizontally over the balance housing, whereby the draft shield is set open in the upward direction. Furthermore, the top cover can also be separated from the linear sliding guide by means of a swiveling movement.

With the trend to introduce time-optimized work processes, one finds more and more applications where different operations are performed, either simultaneously or following each other, directly in the working compartment without repeatedly putting the weighing object on and off the load receiver. This applies in particular to the preparation of solutions or powder mixtures. The design of a multi-functional working compartment is disclosed for example in commonly-owned U.S. Pat. No. 6,603,081 B2. This reference demonstrates how a multitude of devices such as for example dosage-dispensing units, holder devices for source containers and receiving containers, protective shield panels, indicator displays and the like can be installed on a temporary basis in the working compartment in a way that is optimized for a specific work process. As a result, an analytical balance which was originally designed only for weighing becomes a multi-functional laboratory instrument.

The draft shield devices of the known state of the art are optimized primarily for putting a weighing object on the load receiver and/or removing the weighing object after the weighing. These movements normally occur from the side, so that a serial weighing process involving a plurality of weighing objects can be performed in an optimal way for example if the objects to be weighed are delivered to the load receiver from the left side and, after the weighing, are taken off the load receiver from the right side. Furthermore, the weighing materials can also be delivered to the load receiver from above if the top cover is slidable.

However, the broadening of the functionality of the laboratory instruments described above makes it necessary to provide better access to the working compartment. It is therefore the object to propose a working compartment which is improved in regard to its accessibility during the work process.

SUMMARY

This task is solved by a laboratory instrument with the features described in the independent claim 1.

A laboratory instrument comprising a housing containing a weighing cell and further comprising a working compartment which is delimited by a floor, a top cover, a rear wall, a front wall, and two sidewalls. The two sidewalls are slidable in a linear movement between an open position and a closed position. Also arranged in the working compartment is a load receiver which is connected to the weighing cell. The laboratory instrument comprising at least one guiding device in an arrangement where the front wall, or several parts of the front wall that are coupled to each other, are guided by the guiding device so that they can slide in a linear movement as well as swivel in an angular movement between an open position and a closed position. As a result of the sidewalls being slidable and the front wall being able to slide as well as swivel, the working compartment is accessible from three sides if the sidewalls and the front wall are in their open positions at the same time. Of course, the sidewalls and the front wall can also be set at intermediate positions in between the open and closed positions, if necessary.

By having access from three sides, working in the working compartment is made considerably easier. Access from the side in this context refers only to the accessibility of the working compartment by way of the approaches laid open by the sidewalls and the front wall. The terms "top, bottom, front, rear, and side" as used farther below refer to the spatial dimensions of a laboratory instrument set up in a normal operating position.

The swivel angles of the front wall or of individual parts of the front walls relative to the housing are tied to the linear sliding displacement of the front wall. The swivel angle is always enclosed between the swiveling part of the front wall and the corresponding part of the housing. The swivel angle in the closed position of the front wall is always 0° and thus defines the spatial direction of the corresponding part of the housing.

The front wall as described herein meets a long-felt need for better accessibility of the working compartment, which the designs of the known state of the art cannot offer. The reason why this is not possible with state-of-the-art designs is that laboratory instruments with a working compartment have to meet a number of different requirements. On the one hand, the dimensions of the instrument may not be too large, so that the instrument will still fit into existing laboratory work stations. On the other hand, accessibility through the sidewalls needs to be maintained because, for example in the weighing of toxic substances the front wall should stay closed in order to serve as a protective shield.

The front wall with its ability to slide and swivel relative to the housing, with the swivel angle being tied to the amount of linear sliding displacement as a result of the guiding device, provides in combination with the slidable sidewalls the ideal solution to meet the foregoing requirements. First of all, access to the working compartment is excellent, as the front wall in its open position does not cover up any of the sidewalls and the working compartment can therefore always be accessed from the side. Second, the combined sliding and swiveling movement essentially slices the air, and the influence of air turbulence which would be caused by a pure swiveling movement is minimized. Third, with the simultaneous swiveling of the front wall the free space that is required above the working compartment is significantly reduced in comparison to the space required with a purely linear sliding movement of the front wall, which in turn leads to significantly reduced height dimensions for example in fume hoods or glove boxes.

A configuration where the rear wall and the floor of the working compartment are wall portions of the housing is conducive not only to a very compact design of the laboratory instrument but also to a very stable, deformation-resistant working compartment.

The at least one guiding device can have at least one horizontally oriented swivel axis Y and/or at least one vertically oriented swivel axis Z. Of course, the at least one guiding device can have a horizontal as well as a vertical swivel axis at the same time.

In a first embodiment of the laboratory instrument, the front wall is configured as a plate-shaped rigid unit. The guiding device of the plate-shaped front wall includes at least one swivel-pivoted linear sliding guide as well as at least one guide means which is arranged between the front wall and the housing and serves to control the swivel movement by tying it to the linear sliding movement.

With preference the at least one swivel-pivoted linear sliding guide is arranged in the area of a front edge or in the area of a lateral edge of the top cover. Furthermore, the guide means can have the form of a swiveling connector link, a guiding rail, a pull-cord arrangement or a guide groove with a guide body.

However, the coordination which ties the swivel movement to the linear sliding movement of the front wall does not necessarily have to be accomplished by mechanical means. If mechanically separate drive sources are provided for the swivel movement as well as for the linear sliding movement of the front wall, the kinematic profile of the two movements can be freely selected and, if compatible with the way in which these drive sources are controlled, it can also be changed in any desired way. To perform such tasks, drive mechanisms with a piezoelectric element are particularly well suited. They have the advantage that little space is required to accommodate the drive source. The drive mechanism is small and compact and can therefore be mounted in any desired location. As a further advantage, the build-up of electrostatic charges on the drive mechanism or any of its parts is avoided. The drive mechanism is further free of any magnetic or magnetizable parts which could interfere with the operation of a weighing cell that is based on the principle of electromagnetic force compensation.

The at least one swivel-pivoted linear guide preferably has a swivel pivot and at least one guide rail, guide groove, guide roller or guide body serving to guide the linear sliding movement of the front wall. The guiding groove holds a guide portion of the front wall. Ideally, there are two swivel-pivoted linear guides which hold two opposite edge portions of the front wall, so that the front wall is held captive in the linear guides but still remains free to slide in a straight line. It is also conceivable that at least one guide groove is arranged on at least one side of the working compartment and the front wall is guided in the guide groove by means of at least two guide bodies. A configuration of this kind likewise contains the combination of the features of a swivel-pivoted linear guide and a guide means and therefore must be considered to form part of the invention.

In order to secure the closed front wall as much as possible against horizontal movement through a stationary constraint, a positioning ledge with a V-shaped and/or U-shaped channel can be arranged in the front-edge area of the floor to serve as a stable seat for the front wall.

In a second embodiment of the laboratory instrument, the front wall can be designed either in one elastically flexible piece with the ability to bend at a bending axis, or with a plurality of lamellar sections which are articulately connected to each other. As a guide for a front wall of this kind, the laboratory instrument can have at least one guiding device which includes a guide track or a guide groove. This guide track or guide groove extends along two edges of the working compartment which meet at a corner of the latter. Preferably, the guide track or guide groove does not change direction abruptly in a sharp angle but rather forms a curve at said corner. The guide track or guide groove is laid out in such a way that the front wall in the open position does not cover up a sidewall and thus does not prevent the sidewall from being opened.

In order to protect the working compartment even better from the influence of the ambient environment, the sidewalls and/or the top cover and/or the front wall and/or the positioning ledge can be provided with seals that serve to make the working compartment airtight. A working compartment that is sealed off in this manner can at the same time serve as a safety barrier, for example if the work involves toxic substances.

Preferably, the sidewalls and/or the top cover and/or the front wall are connected to at least one dedicated drive mechanism. The latter can be configured in such a way that all walls are opened simultaneously.

As a further possibility the front wall, for example, could be divided horizontally, with the upper half being arranged so that it can slide upwards and swiveled to the back about a horizontal axis. The lower half could be configured with several parts, with the swivel axis likewise arranged horizontally so that the lower part of the front wall can be pushed into a space below the floor. Using an analogous concept, the embodiment just described can also be applied to an arrangement with vertically oriented swivel axes.

BRIEF DESCRIPTION

Details of the laboratory instrument can be found in the description of the embodiments that are shown in the drawings, wherein.

DETAILED DESCRIPTION

Figure 1:
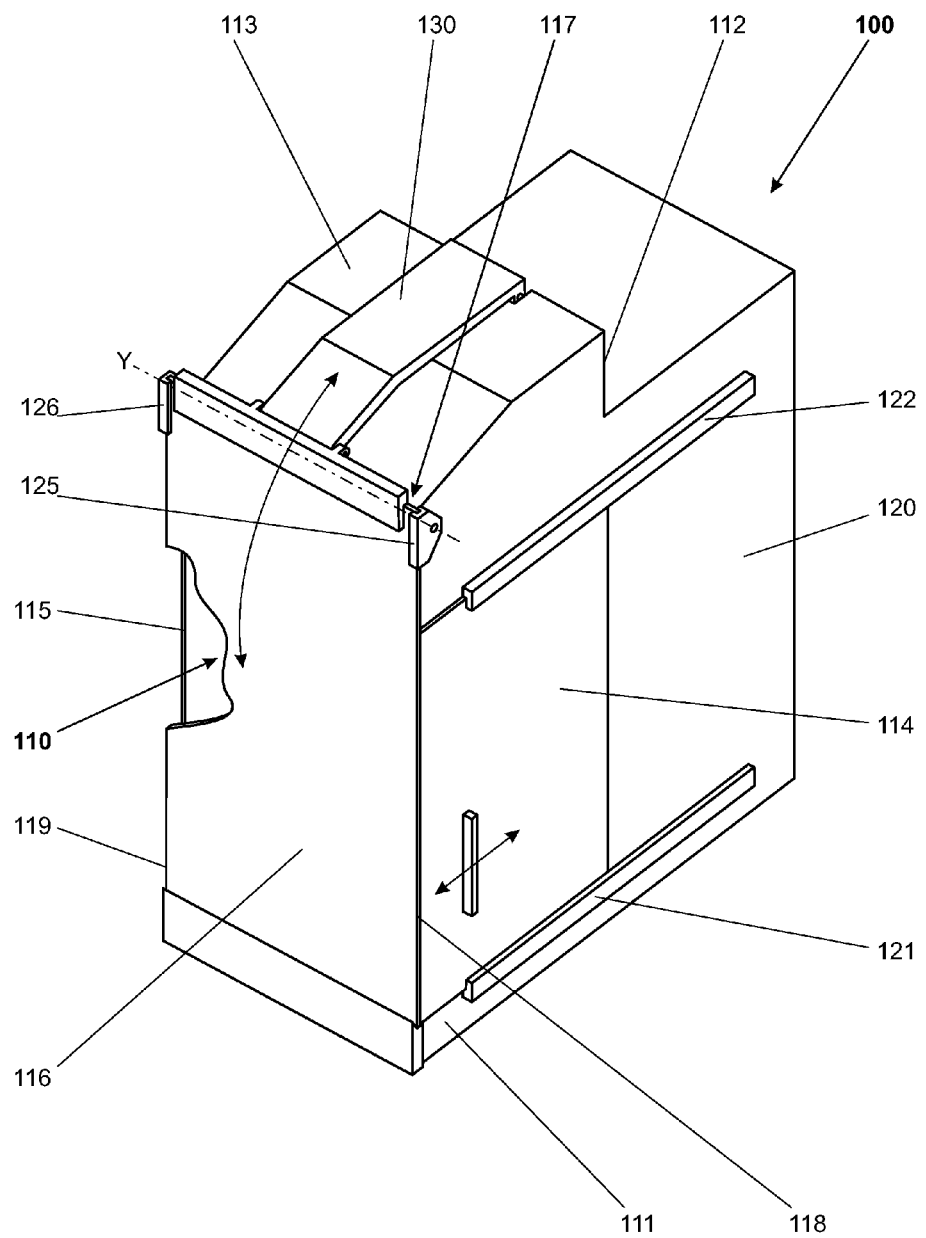
FIG. 1 represents a laboratory instrument in a three-dimensional view in a first embodiment, with a working compartment shown in the closed state, whose sidewalls can be moved along a straight line and whose front wall can be moved between an open position and a closed position through a linear upward movement while simultaneously swiveling backwards about a horizontal swivel axis.

FIG. 1 shows a three-dimensional view of a laboratory instrument 100 in a first embodiment, with a working compartment 110 shown in the closed state and with a housing 120 adjoining the weighing compartment. The floor 111, the rear wall 112 and the top cover 113 of the working compartment 110 are configured as parts of the housing 120. The working compartment 110 is delimited at the sides by two sidewalls 114, 115 which are guided by tracks 121, 122 and thereby constrained so that they can only slide to the back in a linear movement. The working compartment 110 is delimited towards the front by a plate-shaped rigid front wall 116.

The front wall 116 is constrained by two linear sliding guides 125, 126 which are pivotally connected to the housing 120 and thus are part of a guiding device for the front wall 116. One of the two linear sliding guides is arranged in each corner area of the front edge 117 of the top cover 113 with the ability to pivot about a horizontal swivel axis Y, so that two edges 118, 119 of the front wall which lie opposite each other can be held by the linear guides 125, 126. To allow the front wall 116 to be guided in linear motion, each of the linear guides 125, 126 has a U-shaped lengthwise groove which is matched to the dimensions of the edge portions 118, 119 of the front wall 116. As the front wall is folded back over the top cover, it does not encroach on the access to the side walls.

Arranged between the front wall 116 and the housing 120 is a guide means 130 which serves to constrain the swivel movement by tying it to the linear sliding movement. The guide means 130 is likewise part of the guiding device. The guide means 130 in this embodiment is a simple connector link, whose ends are articulately connected to the front wall 116 and to the housing 120, respectively. The pivot axes of the guide means 130 are arranged parallel to the swivel axis Y of the pivoted linear guides 125, 126. As soon as the front wall 116 is moved upwards, for example manually or with the help of a drive mechanism, the guide means 130 also causes the front wall 116 to simultaneously tilt to the back about a horizontal swivel axis. Of course, instead of a connector link, one could also use flexible guide means, for example a pull-cord arrangement.

Furthermore, instead of a connector link the guide means 130 can also consist of at least one guide groove and at least one guide pin that is constrained in the guide groove. While this configuration may tend to be more expensive to produce, it allows the path of movement of the front wall 116 relative to the housing 120 to be brought into better agreement with the spatial situation surrounding the laboratory instrument 100. It is also conceivable that there is at least one guide groove on at least one side and that the front wall 116 is guided in the guide groove by means of at least two guide pins. A configuration of this kind combines the features described above, i.e. a linear guide capable of swiveling in combination with a guide means, and must therefore likewise be considered as part of the invention.

However, the coordination which ties the swivel movement to the linear sliding movement of the front wall does not necessarily have to be accomplished by mechanical means. If mechanically separate drive sources are provided for the swivel movement as well as for the linear sliding movement of the front wall, the kinematic profiles of the two movements can be freely selected as well as changed in any desired way, if it is compatible with the way in which these drive sources are controlled, specifically with the control- and regulating device of the drive sources. To perform such tasks, drive mechanisms with a piezoelectric element are particularly well suited. They have the advantage that little space is required to accommodate the drive source. The drive mechanism is small and compact and can therefore be mounted in any desired location. As a further advantage, the build-up of electrostatic charges on the drive mechanism or any of its parts is avoided. The drive mechanism is further free of any magnetic or magnetizable parts which could interfere with the operation of a weighing cell that is based on the principle of electromagnetic force compensation.

Figure 2:
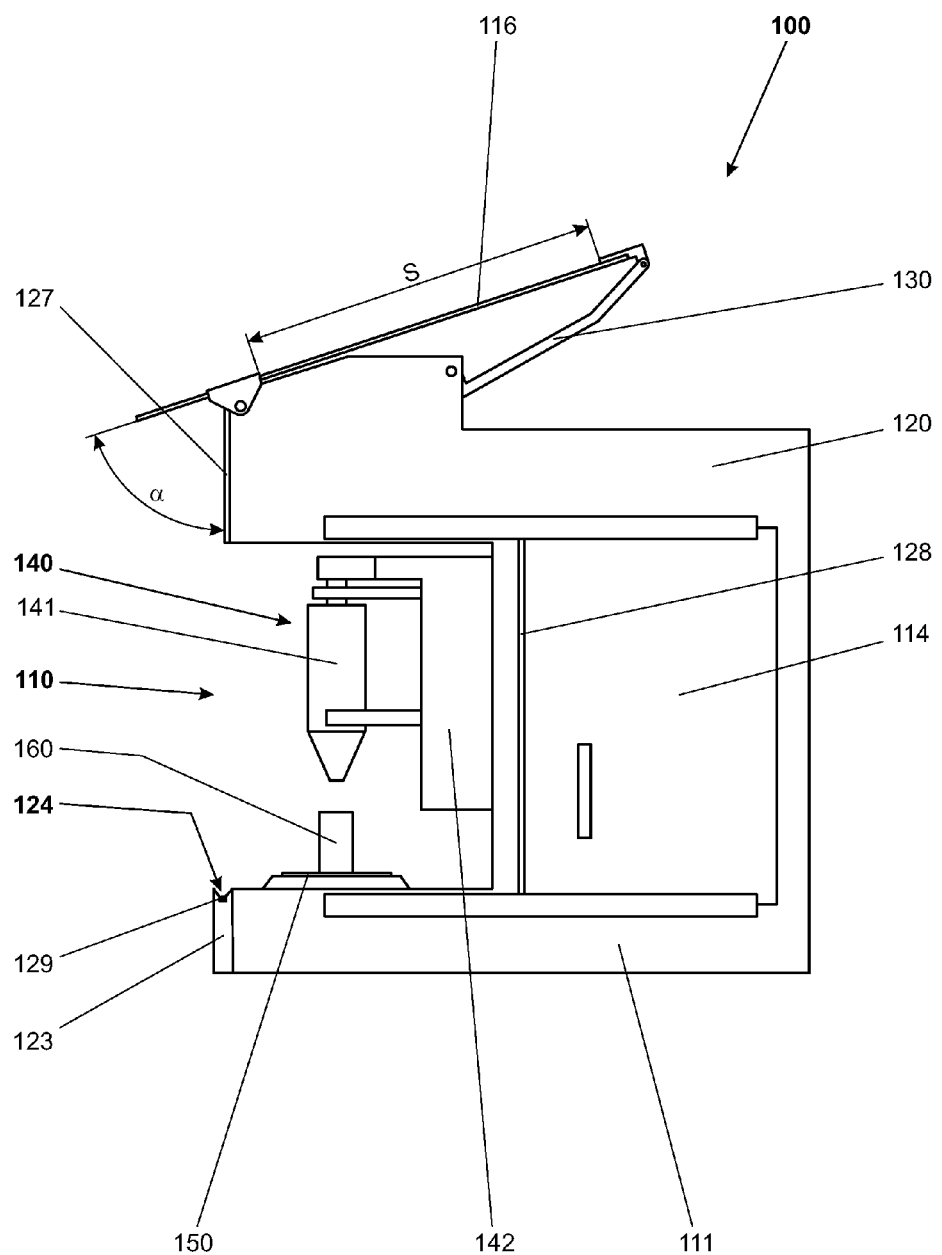
FIG. 2 is a side view of the laboratory instrument of FIG. 1 with a working compartment that is accessible from three sides, shown in the open state.

FIG. 2 shows the laboratory instrument 100 of FIG. 1 in a view from the side with the working compartment 110 in the open state. All of the elements that were described in the context of FIG. 1 carry the same reference symbols. With the front wall 116 being pushed up and swiveled to the back, and with the sidewalls 114 (one of them invisible) being pushed to the back, this illustration offers an unobstructed view of the devices arranged in the working compartment 110. Due to the front wall 116, these devices are accessible from three sides, which improves and simplifies the conditions for performing work inside the working compartment 110 to an extraordinary degree. Installed in the working compartment 110 is a dosage-dispensing device 140 whose dispensing head 141 is arranged above a load receiver 150. The load receiver 150 is functionally connected to a weighing cell (not shown in the drawing) which is enclosed in the housing 120. The weighing signals of the weighing cell are transmitted to a control- and regulation unit 142, by means of which the outlet aperture of the dispensing head 141 can be varied in response to the weighing signal. To receive the dosage material delivered by the dispensing head 141, a receiving container 160 is placed on the load receiver 150.

As is clearly evident from FIG. 2, the minimally required free space above the laboratory instrument 100 is dictated by the length of the guide means 130. Although FIG. 2 shows the front wall only in the open position, it clearly illustrates that the swivel angle α of the front wall 120 relative to the housing 120 depends on the linear distance s by which the front wall 116 has been moved in relation to the housing 120.

Preferably, as many as possible of the parts that enclose the working compartment 110, particularly the front wall 116 and the sidewalls 114, 115 and possibly also the top cover 113 are made of transparent material, so that the inside of the working compartment 110 is visible from the outside also in the closed position.

As already mentioned above, the working compartment should be designed to be as stable as possible in regard to maintaining its shape. In order to lend more stability to the front wall 116 when the latter is in its closed position, there can be a positioning ledge 123 arranged in the area of the front edge of the floor 111. The positioning ledge 123 has a V-shaped groove 124 in which the bottom edge of the front wall 116 is seated when the latter is in its closed position. Preferably, the edge portions of the sidewalls 114, 115 that face towards the front wall 116 have seals 128. In the groove 124, there can likewise be an elastic seal 129 arranged which not only seals the bottom-facing edge of the front wall 116 but also, in case the front wall 116 is closed manually, softens the impact in the groove 124. Furthermore, some parts of the housing 120 can likewise be provided with seals 127 in order to seal the working compartment 110 as tightly as possible against the ambient environment of the laboratory instrument 100. The sealing of the working compartment 110 can have a dual function. First, air currents which affect the weighing signal are kept away from the load receiver 150 and the receiving container 160. Second, the caulking and sealing of the working compartment 110 serves as a safety barrier for example if toxic pulverous substances are to be dispensed in the weighing compartment 110.

Of course, the first embodiment of the preceding description can also have a vertically oriented swivel axis instead of the horizontally oriented swivel axis Y, in which case the front wall 116, logically, cannot be folded back over the top cover 113 but rather over a sidewall 114, 115.

Figure 3:
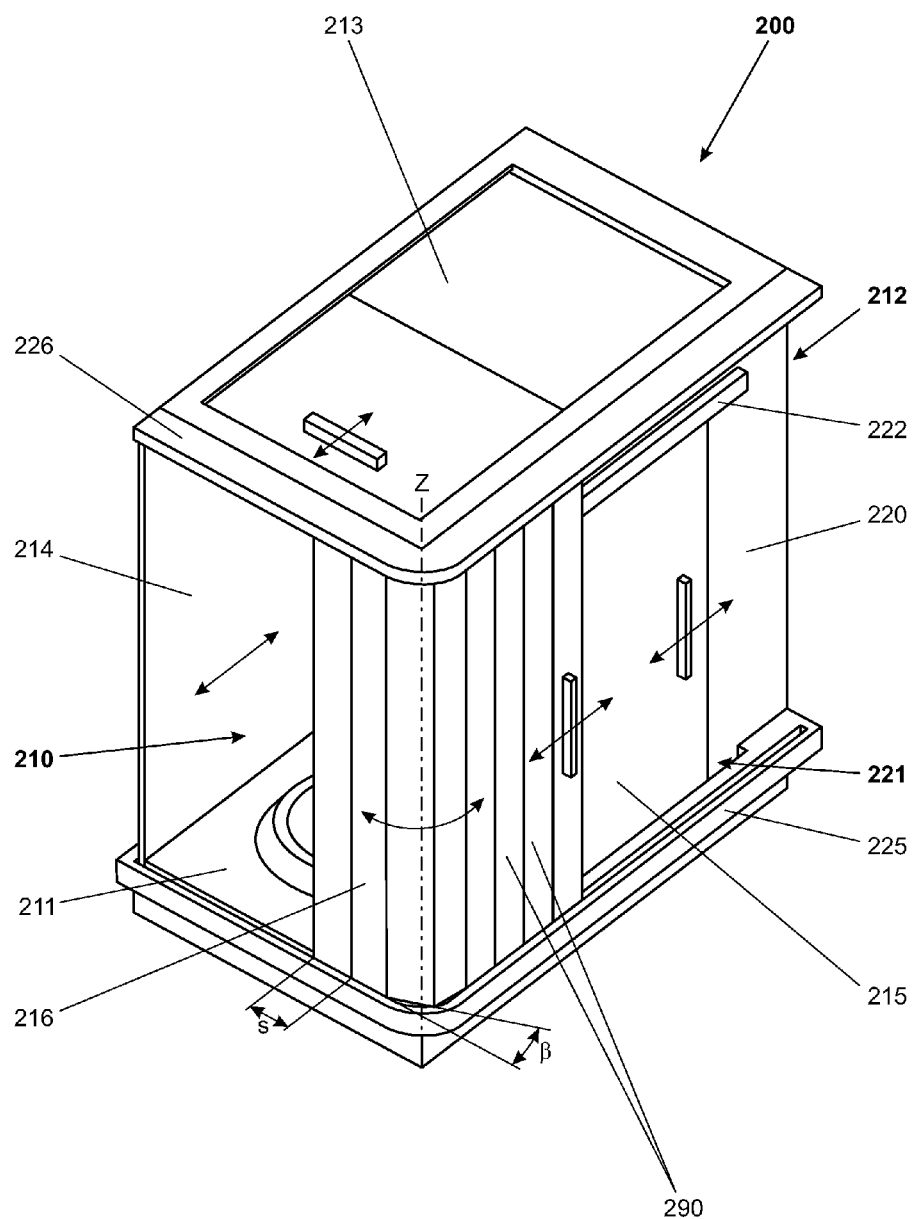
FIG. 3 represents a laboratory instrument in a three-dimensional view in a second embodiment, with a working compartment whose front wall is of a multi-part configuration, wherein the front wall sections can be moved sideways and towards the back in straight lines, while at the same time individual sections can swivel about a vertical swivel axis.

FIG. 3 shows a laboratory instrument 200 in three-dimensional view in a second embodiment which likewise has a housing 220 and a working compartment 210. The floor 211, the rear wall 212 and the top cover 213 of the working compartment 210 are configured as parts of the housing. The working compartment 210 is delimited on the sides by two sidewalls 214, 215 which are guided in tracks 221, 222 and can be pushed to the back in a straight-line movement. The working compartment 210 is further delimited towards the front by a front wall 216 which has a multi-part configuration. It consists essentially of a plurality of lamellar sections 290 which are articulately connected to each other. The front wall 216 is guided by guide tracks 225, 226 arranged, respectively, in the floor 211 and the top cover 213 and serving as guiding devices. These guide tracks 225, 226 extend along the front edge and one side of the laboratory instrument 200. These tracks have essentially one guide groove in which guide bodies (not shown in this drawing) are guided that are arranged at the lamellar sections 290. Depending on the configuration and the stability of the arrangement, it is of course also possible to have only one guiding device. As is clearly evident from FIG. 3, the guide track of the front wall 216 is designed so that the front wall 216 moves over the sidewall 215 when the latter is in its open position and the lateral access to the working compartment 210 which has been freed of the sidewall 215 is not covered up by the front wall.

Unlike the front wall shown in FIG. 2, with the configuration of FIG. 3 only individual portions, i.e. lamellar sections 290 of the front wall 216 are swiveled as a result of a linear displacement s. It can also be clearly seen in FIG. 3 that the swivel angle β depends on the amount of linear displacement s of the front wall 216 relative to the housing 120.

As shown in FIG. 3, the track 221 and the guide track 225 can be formed in one part in the area of the sidewall 214. When a front wall 216 of a multi-part configuration, i.e. with articulated sections, is combined with a guide track 225, 226 having a guide groove, the parts or lamellar sections 290 of the front wall 216 can be moved in a linear displacement to the side and to the back, while at the same time individual sections are swiveled about a vertical swivel axis Z.

It is considered self-evident that various further developments of this concept are conceivable, for example that the front wall 216 is split vertically down the middle into two parts and the first part can be pushed to the right side and the second part to the left side of the laboratory instrument 200. Further embodiments are also conceivable where the individual parts can be swiveled about at least one horizontal swivel axis. This horizontal swivel axis can be arranged in the area of the top cover 213 as well as in the area of the floor 211 or in both areas.

Furthermore, combinations of the embodiment shown in FIG. 1 with the embodiment shown in FIG. 3 are definitely possible. For example, the front wall could be split horizontally, with the upper half being able to slide upwards and swivel to the back as in FIG. 1. The lower half could have a multi-part configuration analogous to the embodiment of FIG. 3, with the swivel axis being arranged horizontally, thereby allowing the lower part of the front wall to be pushed back into a space below the floor.

FIGS. 4 to 6 show different design variants of multi-part front walls of the kind used in the laboratory instrument illustrated in FIG. 3.

Figure 4A:
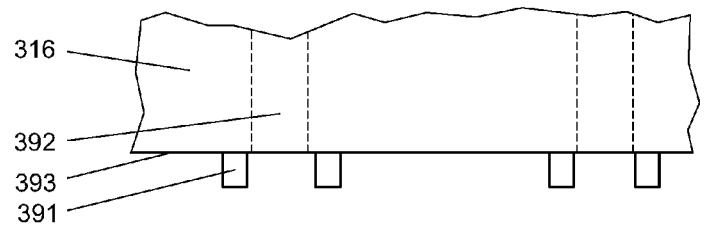
FIG. 4A is a plan view of a part of a flexible front wall that is capable of elastic bending about a bending axis.
Figure 4B:
FIG. 4B is a sectional view the same part of the front wall as FIG. 4A.

In FIG. 4A, a first example is shown of a front wall 316 that has a plurality of sections. The front wall 316, only a portion of which is illustrated in a fragmentary view, is made of one piece and designed with the flexibility to bend elastically about a bending axis. To make the front wall 316 sufficiently rigid to resist bending in the vertical direction but allowing it to flex about a vertically arranged swivel axis, the front wall has a plurality of bending zones 392 extending vertically and configured as thin flexure joints. The thin flexure joints 392 are represented more clearly in FIG. 4B which shows a sectional view of the fragmentary portion of the front wall 316 that is shown in FIG. 4A. To guide the front wall 316 in the guide means without jamming, several guide bodies 391 are arranged along the border area 393 of the front wall 316. It is considered self-evident that front walls 316 of this type can only be made of elastic materials for example of a transparent polymer.

Figure 5A:
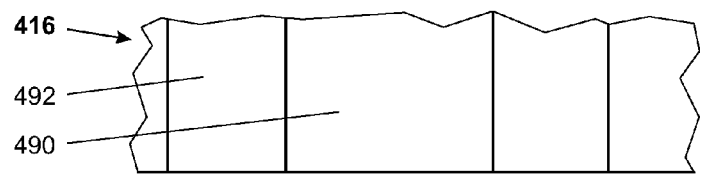
FIG. 5A is a plan view of a part of a front wall of a multi-part configuration, whose lamellar sections are connected to each other by connector elements that are capable of elastic bending.
Figure 5B:
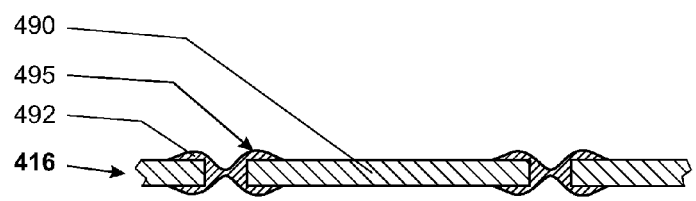
FIG. 5B is a sectional view of the same part of the front wall as FIG. 5A.

FIG. 5A shows in plan view a portion of a second embodiment of a front wall 416 of multi-part configuration, whose individual lamellar sections 490 are connected to each other by elastically flexible connector elements 492. An arrangement of this kind is particularly appropriate if the individual lamellar sections 490 are made of a relatively inflexible material, for example glass. The structural composition of the front wall 416 can be seen even better in FIG. 5B which represents a sectional view of the front wall 416 of FIG. 5A. On the fork-shaped profiles of the elastically flexible connector elements 492, glide-bearing points are formed which are functioning as guide bodies in the guide tracks. Thus, it is not necessarily required to install additional a guide bodies.

Figure 6A:
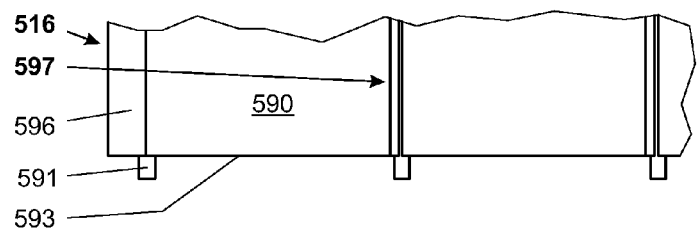
FIG. 6A is a plan view of a part of a front wall of a multi-part configuration, whose lamellar sections are connected to each other by hinges which are formed on the lamellar elements.
Figure 6B:
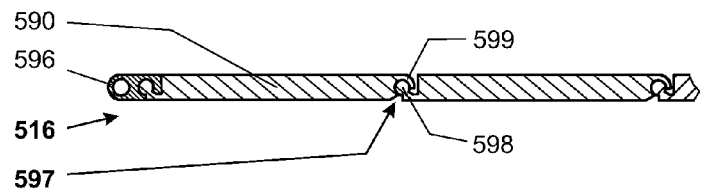
FIG. 6B is a sectional view of the same part of the front wall as FIG. 6A.

FIG. 6A shows in plan view a portion of a front wall 516 of multi-part configuration, whose individual lamellar sections 590 are connected to each other by hinges 597 which are formed on the lamellar sections 590. As shown in FIG. 6B which represents a sectional view of the front wall 516 of FIG. 6A, the hinge 597 is divided into a hinge pin 598 and a hinge bracket 599. The lamellar section 590 extends between the hinge pin 598 and the hinge bracket 599 and is integrally connected to them. As a result, the front wall 516 in this multi-part configuration can be produced by using a simple extrusion profile which can be cut into sections of equal length, whereupon the individual sections can be connected by sliding them into each other. Furthermore, a guide body 591 which is arranged in the border area 593 can be formed of a portion of the hinge pin 598 or can be solidly connected to the latter. The front wall 516 further has an elastic seal 596 at its end section 590.

What is claimed is:

1. A laboratory instrument having a working compartment with access from three sides thereof when at least partially opened, the instrument comprising:
   a housing that contains a weighing cell and which comprises a floor, a top cover, a front and a rear wall, and a pair of sidewalls that delimit the working compartment, the sidewalls and the front wall each being arranged to slide linearly between a closed position and an open position,
   a load receiver, arranged in the working compartment and connected to the weighing cell; and
   at least one guiding device that guides the front wall, as a unit or as a plurality of coupled portions, in an angular swivel movement, as well as the linear sliding movement, between the open and closed positions,
   such that simultaneous at least partial opening of each of the two sidewalls and the front wall provides the access.

2. The laboratory instrument of claim 1, wherein:
   an angle of swivel of the front wall, as a unit or as a plurality of coupled portions, relative to the housing is dependent upon a linear displacement distance of the front wall from the closed position.

3. The laboratory instrument of claim 2, wherein:
   the rear wall and the floor of the working compartment are wall portions of the housing.

4. The laboratory instrument of claim 1, wherein:
   the at least one guiding device has at least one horizontally oriented swivel axis.

5. The laboratory instrument of claim 1, wherein:
   the at least one guiding device has at least one vertically oriented swivel axis.

6. The laboratory instrument of claim 1, wherein:
   the front wall is configured as a plate-shaped rigid unit; and
   the at least one guiding device comprises:
      at least one swivel-pivoted linear guide of the front wall; and
      at least one means for guiding, arranged between the front wall and the housing and serving to control the swivel movement dependent on a linear displacement distance of the front wall from the closed position.

7. The laboratory instrument of claim 6, wherein:
   the at least one swivel-pivoted linear guide is arranged on the top cover in the area of a front edge or of a lateral edge.

8. The laboratory instrument of claim 6, wherein:
   the guiding means is selected from the group consisting of: a swiveling connector link, a guiding rail, a pull-cord arrangement and a guide groove with a guide body.

9. The laboratory instrument of claim 6, wherein:
   the guiding means is a drive mechanism control device which controls a drive source for the swiveling movement of the front wall, dependent on the linear displacement movement of a linear drive source of the front wall.

10. The laboratory instrument of claim 6, wherein:
    the at least one swivel-pivoted linear guide comprises a swivel pivot and, serving to guide the linear movement of the front wall, at least one of: a guide rail, a guide groove, a guide roller or a guide body.

11. The laboratory instrument of claim 6, further comprising:
    a positioning ledge, arranged in the area of the front edge of the floor and serving to provide a stable seat for the front wall.

12. The laboratory instrument of claim 11, wherein:
    the positioning ledge has a groove with a V-shape or a U-shape.

13. The laboratory instrument of claim 1, wherein:
    the front wall is a single piece that is elastically flexible or is a configuration of a plurality of lamellar sections that are articulately connected to each other; and
    the at least one guiding device comprises a guide track or a guide groove.

14. The laboratory instrument of claim 1, further comprising:
    a seal for the working compartment is provided on at least one of: the sidewalls, the top cover, the front wall and, if present, the positioning ledge.

15. The laboratory instrument of claim 1, wherein:
    the top cover is arranged for linear sliding movement relative to the housing.

16. The laboratory instrument of claim 1, wherein:
    the at least one drive mechanism is connected to at least one of: the sidewalls, the top cover and the front wall.

17. The laboratory instrument of claim 3, wherein:
    the front wall is configured as a plate-shaped rigid unit; and
    the at least one guiding device comprises:
       at least one swivel-pivoted linear guide of the front wall; and
       at least one means for guiding, arranged between the front wall and the housing and serving to control the swivel movement dependent on a linear displacement distance of the front wall from the closed position.

18. The laboratory instrument of claim 3, wherein:
    the front wall is a single piece that is elastically flexible or is a configuration of a plurality of lamellar sections that are articulately connected to each other; and the at least one guiding device comprises a guide track or a guide groove.

19. A laboratory instrument having a working compartment with access from three sides thereof when at least partially opened, the instrument comprising:
- a housing that contains a weighing cell and which comprises a floor, a top cover, a front and a rear wall, and a pair of sidewalls that delimit the working compartment, the sidewalls and the front wall each being arranged to slide linearly between a closed position and an open position, the rear wall and the floor being wall portions of the housing;
- a load receiver, arranged in the working compartment and connected to the weighing cell; and
- at least one guiding device that guides the front wall, which is configured as a plate-shaped rigid unit, in an angular swivel movement, as well as the linear sliding movement, between the open and closed positions, the swivel movement having an angle of swivel that depends upon a linear displacement distance of the front wall from the closed position, each of the at least one guiding devices comprising:
  - at least one swivel-pivoted linear guide of the front wall; and
  - at least one means for guiding, arranged between the front wall and the housing, that controls the swivel movement dependent on a linear displacement distance of the front wall from the closed position, such that simultaneous at least partial opening of each of the two sidewalls and the front wall provides the access.

* * * * *